(12) United States Patent
Ohtomo et al.

(10) Patent No.: US 7,095,490 B2
(45) Date of Patent: Aug. 22, 2006

(54) ELECTRIC DISTANCE METER

(75) Inventors: Fumio Ohtomo, Tokyo (JP); Kaoru Kumagai, Tokyo (JP); Kenichiro Yoshino, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 163 days.

(21) Appl. No.: 10/756,855

(22) Filed: Jan. 14, 2004

(65) Prior Publication Data

US 2004/0145723 A1    Jul. 29, 2004

(30) Foreign Application Priority Data

Jan. 16, 2003 (JP) ............... 2003-007744

(51) Int. Cl.
*G01C 3/08* (2006.01)
(52) U.S. Cl. ............... 356/5.01; 356/3.01; 356/4.01; 356/5.01
(58) Field of Classification Search ......... 356/5.01
See application file for complete search history.

(56) References Cited

U.S. PATENT DOCUMENTS

| | | | | |
|---|---|---|---|---|
| 3,778,159 A | * | 12/1973 | Hines et al. ............ | 356/5.11 |
| 3,967,111 A | * | 6/1976 | Brown ................ | 250/206 |
| 4,319,332 A | * | 3/1982 | Mehnert .............. | 342/27 |
| 4,692,023 A | * | 9/1987 | Ohtomo et al. ......... | 356/5.11 |
| 4,891,624 A | * | 1/1990 | Ishikawa et al. ........ | 340/436 |
| 5,179,286 A | * | 1/1993 | Akasu ............... | 250/559.38 |
| 6,452,666 B1 | * | 9/2002 | Barna et al. ........... | 356/5.01 |

FOREIGN PATENT DOCUMENTS

| | | | |
|---|---|---|---|
| JP | 05-232232 | | 9/1993 |
| JP | 06051062 A | * | 2/1994 |
| JP | 10285227 A | * | 10/1998 |

* cited by examiner

*Primary Examiner*—Thomas H. Tarcza
*Assistant Examiner*—Luke Ratcliffe
(74) *Attorney, Agent, or Firm*—Chapman and Cutler LLP

(57) ABSTRACT

An electric distance meter of the present invention comprises a device (1) to generate a modulation signal for modulating measuring light which is irradiated to an object, a device (4) to periodically generate an intermittent pulse signal for generating intermittent modulated measuring light by intermittently adding the modulation signal to a light emitting element (10), a device (5A) to generate an internal frequency signal (S5) with a frequency different from the modulation signal (S2), a light receiving element (27) for outputting a light receiving signal by receiving the intermittent modulated measuring light, a device (7) to generate an intermittent difference frequency signal (S7) by inputting the light receiving signal (S4) and the signal (S5), an arithmetic logical unit (36) for calculating a distance to the object based on a phase difference between a phase of the signal (S7) output from the device (7) and a phase of the intermittent difference frequency signal obtained through a reference optical path.

5 Claims, 7 Drawing Sheets

ELECTRIC DISTANCE METER

BACKGROUND OF THE INVENTION

Field of the Invention

The present invention relates to an improvement in an electric distance meter which irradiates modulated measuring light to an object to be projected, and receives the measuring light reflected from the object to be measured, and then measures a distance to the object to be measured by the phase difference between the measuring light and the reflected measuring light.

Conventionally, an electric distance meter irradiates measuring light from the electric distance meter to a reflection prism as an object to be measured disposed in a place to be measured, and receives the measuring light reflected from the reflection prism, and then measures the distance to the place to be measured by the phase difference of reflected measuring light (For example, reference to Japanese Patent Laid Open H05-232232).

Recently, with the demand for measuring a place where is not directly reached, there has been an increasing demand of electric distance meter for measuring the distance to an object to be measured by receiving and detecting the measuring light reflected from the object to be measured without using a reflection prism (Japanese Patent Laid-Open H05-232232).

A surveying machine for conducting a measurement of distance without using a reflection prism generally has a small reflectivity of object to be measured, and has a short measurable distance because it is easy to be affected by noise, so that it is demanded to extend a measurable distance. Since the extension of measurable distance is proportion to irradiating light volume, it depends on the output of measuring light irradiated from an electric distance meter.

However, a laser beam is generally used for measuring light, and the output of measuring light irradiated from an electric distance meter is restricted by a safety standard and the like taking safety of eyes into consideration.

SUMMARY OF THE INVENTION

The present invention has been made in view of aforementioned problems, and an object of the present invention is to provide an electric distance meter or a laser telemeter device which can extend a range of measurable distance while maintaining safety of eyes.

According to a first aspect of the present invention, an electric distance meter comprises a device to generate a signal for modulating measuring light which is irradiated to an object to be measured, a pulse signal generation device to periodically generate an intermittent pulse signal for generating intermittent modulated measuring light by intermittently adding the modulation signal to a light emitting element, a frequency signal generation device to generate an internal frequency signal with a frequency different from the modulation signal, a light receiving element for outputting a light receiving signal by receiving the intermittent modulated measuring light, a difference frequency signal generation device to generate an intermittent difference frequency signal by inputting the light receiving signal and the internal frequency signal, and an arithmetic logical unit for calculating a distance to the object to be measured based on a phase difference between a phase of the intermittent difference frequency signal output from the difference frequency signal generation device and a phase of the intermittent difference frequency signal obtained through a reference optical path.

According to a second aspect of the present invention, the electric distance meter according to the first aspect comprises a circuit for sampling a signal generation period of the intermittent difference frequency signal with a predetermined interval and a storing device to store sampling data, and the arithmetic logical unit calculates the phase difference based on the sampling data stored in the storing device.

According to a third aspect of the present invention, the electric distance meter according to the first aspect comprises a processing circuit for averaging the signal generation period of the intermittent difference frequency signal, a circuit for sampling the signal averaged by the averaging processing circuit, and a storing device to store sampling data, and the arithmetic logical unit calculates the phase difference based on the sampling data stored in the storing device.

According to a fourth aspect of the present invention, in the electric distance meter according to the first aspect, the arithmetic logical unit generates a sine wave curve based on the sampling data obtained by sampling the signal generation period of the intermittent difference frequency signal with the predetermined interval, while generates a sine wave curve based on the sampling data obtained by sampling a signal generation period of the intermittent difference frequency signal obtained through the reference optical path, and calculates a distance based on the phase difference between both of the sine wave curves.

According to a fifth aspect of the present invention, in the electric distance meter according to the fourth aspect, the sampling data is integrated for a plurality of periods of the intermittent difference frequency signal, and the arithmetic logical unit generates the sine wave curve based on the data integrated for the plurality of periods.

According to a sixth aspect of the present invention, in the electric distance meter according to the fourth aspect, the arithmetic logical unit collects noise in a non-generation period of the intermittent pulse signal by the intermittent pulse signal generation device as sampling noise data, generates a noise curve based on the sampling noise data, and corrects the sine wave curve by obtaining a difference of the noise curve from the sine wave curve obtained by sampling the signal generation period.

According to a seventh aspect of the present invention, in the electric distance meter according to the first aspect, the period of the intermittent pulse signal corresponds to the period of the modulation signal with an interval.

According to an eighth aspect of the present invention, the electric distance meter according to the first aspect generates the intermittent difference frequency signal by inputting the internal frequency signal directly to the light receiving element.

BRIEF DESCRIPTION OF THE ATTACHED DRAWINGS

DESCRIPTION OF THE PREFERRED EMBODIMENT

Figure 1:
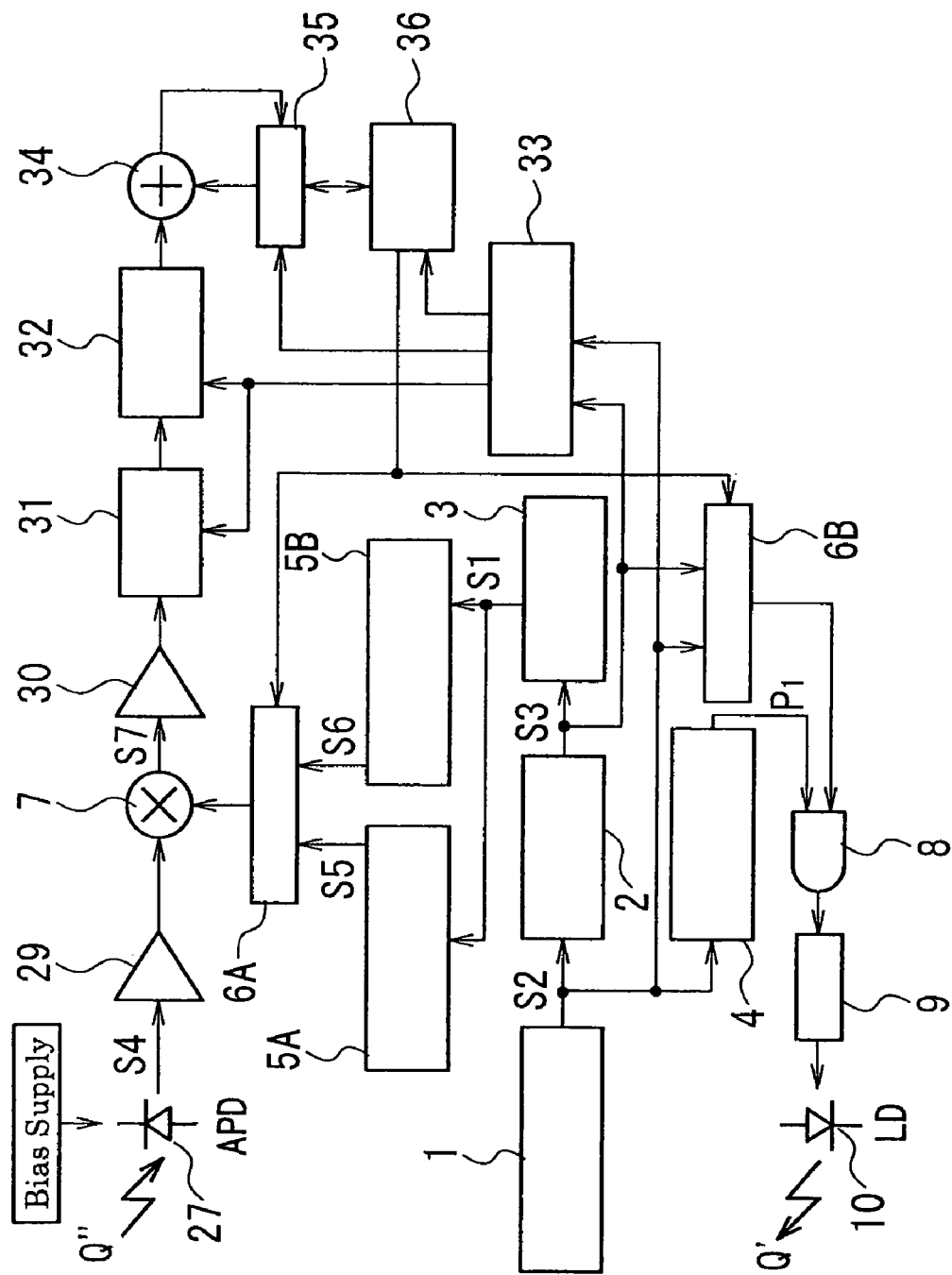
FIG. 1 is a block diagram illustrating a measuring circuit of electric distance meter according to the present invention.
Figure 2:
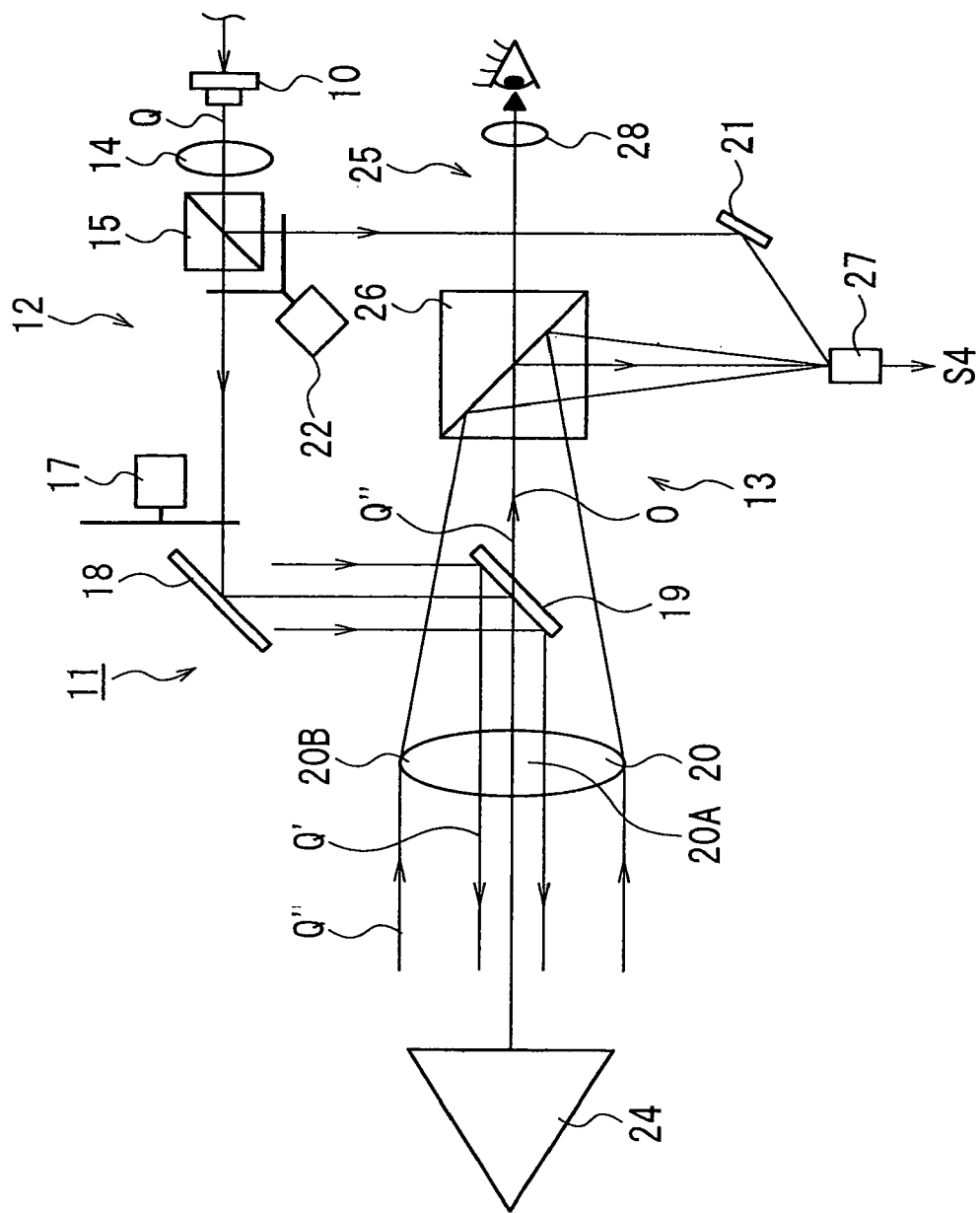
FIG. 2 is a schematic view illustrating a range finding optical system of electric distance meter according to the present invention.

FIG. 1 is a block diagram illustrating a measuring circuit of electric distance meter according to the present invention, and FIG. 2 is a diagram illustrating an optical system thereof. In FIG. 1, reference numeral 1 denotes a reference signal generator, reference numerals 2 and 3 are dividing circuits, and reference numeral 4 is an intermittent pulse signal generator (pulse signal generation device).

The reference signal generator 1 generates a modulation signal with a frequency of 30 MHz for modulating the measuring light which is irradiated to an object to be measured. The dividing circuit 2 divides the 30 MHz modulation signal into 1/100, and generates a 300 KHz modulation signal. The reference signal generator 1 and the dividing circuit 2 are operated as a device for generating a modulation signal. The dividing circuit 3 divides the 300 KHz modulation signal into 1/100, and generates a 3 KHz signal.

The 3 KHz signal is input into a first signal generator 5A and a second signal generator 5B. The first signal generator 5A generates an internal frequency signal S5 with a frequency substantially from 30 MHz to 3 KHz which is slightly different from the modulation signal with a frequency of 30 MHz.

The second signal generator 5B generates an internal frequency signal S6 with a frequency substantially from 300 KHz to 3 KHz which is slightly different from the modulation signal with a frequency of 300 KHz. The internal frequency signal S5 from the first signal generator 5A and the internal frequency signal S6 from the second signal generator 5B are input into a mixing circuit 7 (difference frequency signal generation circuit) through a switching gate 6A. The switching gate 6A is switched between a mode for outputting the internal frequency signal S5 of 30 MHz to 3 KHz toward the mixing circuit 7 and a mode for outputting the internal frequency signal S6 of 300 KHz to 3 KHz toward the mixing circuit 7 by an arithmetic logical unit 36.

Figure 3:
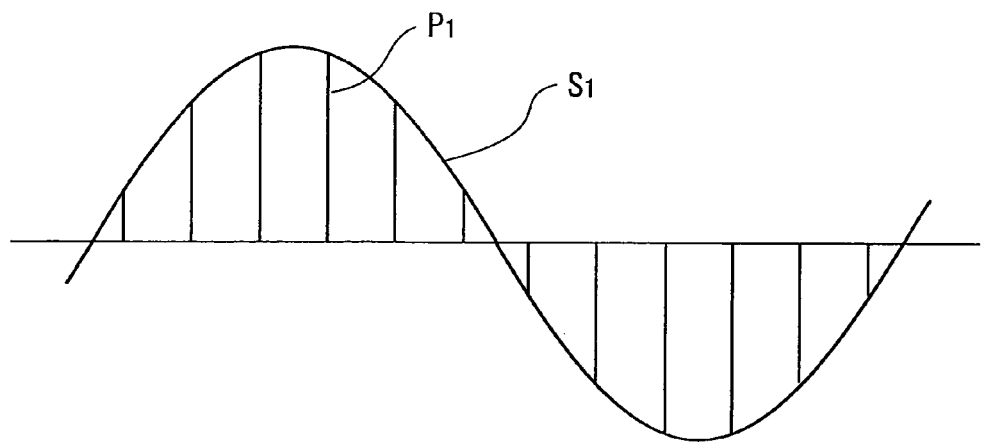
FIG. 3 is a frame format for describing the relationship between a 3 KHz frequency and an intermittent pulse signal according to the present invention.
Figure 4:
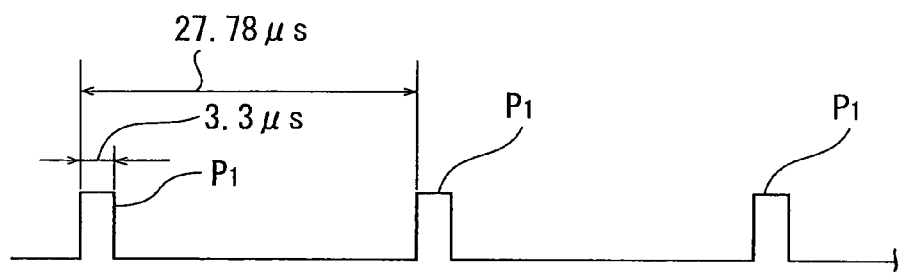
FIG. 4 is a wave form chart illustrating intermittent pulse signals according to the present invention.

As shown in FIG. 3, the pulse signal generator 4 generates an intermittent pulse signal 1, which is synchronized to the reference signal generator 1, having a 1/12 period of the period of a 3 KHz frequency signal S1. The period of the intermittent pulse signal P1 is 27.78 μs as shown in FIG. 4, and its pulse width is 3.3 μs. The period and width of pulse can be changed arbitrarily.

The intermittent pulse signal P1 is input to a negative terminal of an AND circuit 8. A modulation signal S2 from the reference signal generator 1 and a modulation signal S3 from the dividing circuit 2 are input to the other terminal of AND circuit 8 through a switching gate 6B. The switching gate 6B is switched between a mode for outputting the 30 MHz modulation signal S2, which is synchronized to the switching gate 6A, toward one terminal of the AND circuit 8 and a mode for outputting the 300 KHz modulation signal S3, which is synchronized to the switching gate 6A, toward the other terminal of the AND circuit 8. The modulation signal S2 with a frequency of 30 MHz is used for a short distance measurement. The modulation signal S3 with a frequency of 300 KHz is used for a long distance measurement. At this point, the modulation signal S2 with a frequency of 30 MHz is selected.

Figure 5:
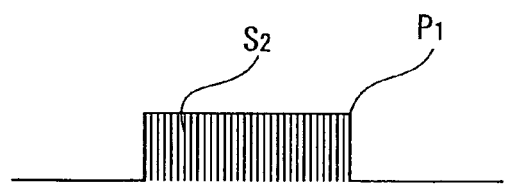
FIG. 5 is a partly enlarged view describing modulation signals with a frequency of 30 MHz included in an intermittent pulse signal.
Figure 6:
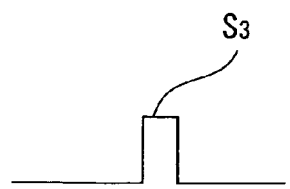
FIG. 6 is a partly enlarged view describing a modulation signal with a frequency of 300 KHz included in an intermittent pulse signal.

As illustrated in FIG. 5 with the enlarged view, when the switching gate 6B is switched to the mode for outputting 30 MHz frequency, the AND circuit 8 outputs 100 modulation signals S2 with a frequency of 30 MHz toward a driver circuit 9 during the period that the intermittent pulse signal P1 is generated. When the switching gate 6B is switched to the mode for outputting the 300 KHz frequency, as shown in FIG. 6, the AND circuit 8 outputs a modulation signal S3 with a frequency of 300 KHz toward the driver circuit 9 during the period that the intermittent pulse signal P1 is generated. The driver circuit 9 drives laser diode or LED as a light emitting element 10.

Figure 7:
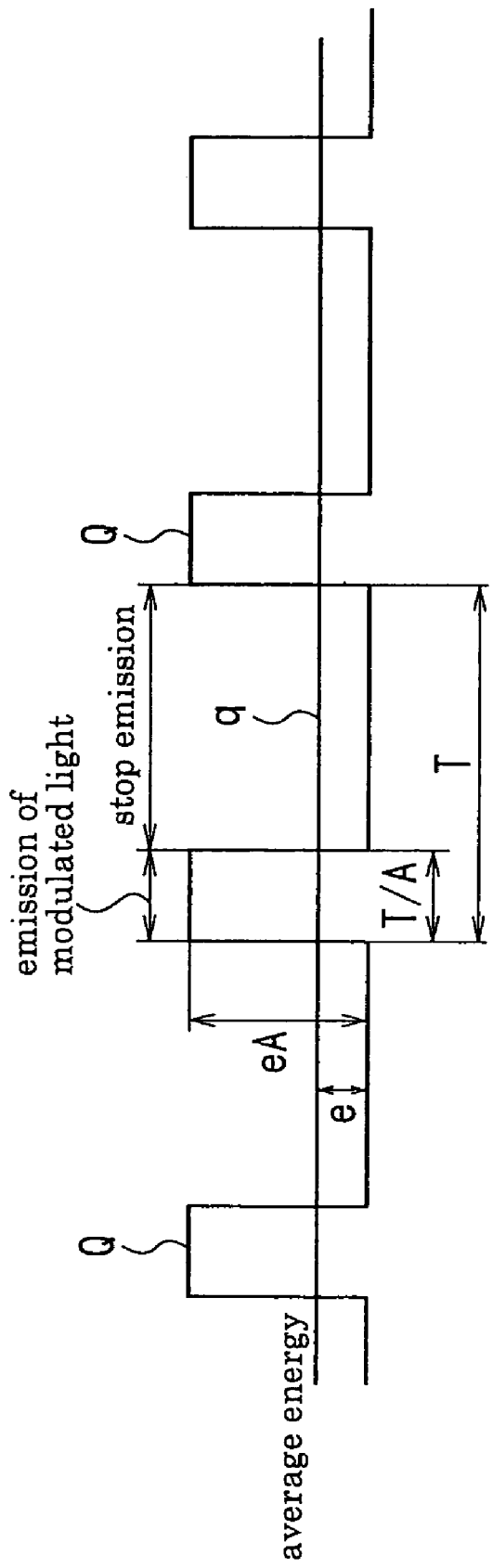
FIG. 7 is a view describing the energy relationship between modulated light and measuring light generally modulated continuously according to the present invention.

Consequently, as shown in FIG. 7, the modulated light Q is intermittently irradiated to the after mentioned object to be measured. At this point, adopting an average energy when emitting continuously modulated measuring light q as e, the average energy e is increased by A, and if the modulated light Q is adopted to be emitted during the period of 1/A of an emitting period T, the average energy of emitting light becomes the same as when the measuring light q is continuously emitted; however, SIN ratio is improved by $A^{1/2}$ while keeping a safety standard to eyes.

The laser diode configures part of the range finding optical system 11 as shown in FIG. 2. The range finding optical system 11 includes a projecting optical system 12 and a light receiving optical system 13. The projecting optical system 12 includes a collimator lens 14, a splitting mirror 15, a light volume adjustor 17, a total reflection mirror 18, a reflection mirror 19, and an objective lens 20.

The collimator lens 14 converts the modulated light Q emitted from the light emitting element 10 into a parallel luminous flux as modulated measuring light Q'. An optical path switching device 22 for switching the parallel flux between a measuring optical path including the total reflection mirror 18 and a reference optical path including a total reflection mirror 21 which leads the parallel flux to the after mentioned light receiving element is disposed in the vicinity of the splitting mirror 15. The light volume adjustor 17 has a role for adjusting the light volume of measuring light.

The modulated measuring light Q' is reflected from the total reflection mirror 18, and is led to the reflection mirror 19. The center of reflection mirror 19 is coaxially disposed to the center O of the objective lens 20. The reflection mirror 19 reflects the measuring light Q' reflected from the total reflection mirror 18 toward the objective lens 20.

When an object to be measured is a retroreflection prism 24, the modulated measuring light Q' which passed through a central portion 20A of the objective lens 20 is reflected from the retroreflection prism 24. When an object to be measured is a scatter which is the surface of an object, and is not the retroreflection prism 24, the modulated measuring light Q' which passed through the central portion 20A of the objective lens 20 is again directed toward the direction, where the objective lens 20 is existed, as the reflection modulated measuring light Q" from the scatter.

The reflection modulated measuring light Q" reflected from the retroreflection prism 24 or the scatter is led to the light receiving optical system 13 through the peripheral portion 20B of the objective lens 20. The light receiving optical system 13 is provided with a wavelength division mirror 26 for constructing part of a collimation optical system 25 and a light receiving element 27. Visible light transmits the wavelength division mirror 26, and is led to an eyepiece lens 28. A surveying worker can collimate the retroreflection prism 24 through the eyepiece lens 28.

Avalanche photodiode or APD is used for the light receiving element 27, for example. The light receiving element 27 receives the reflection modulated measuring light Q", and outputs a light receiving signal (measuring signal) S4 as shown in FIG. 8C.

The light receiving signal S4 is input into the mixing circuit 7 after amplified by an amplifier 29 as shown in FIG. 1. The mixing circuit 7 generates an intermittent difference frequency signal S7 based on the light receiving signal S4 and the frequency signal S5 or S6. FIG. 8B illustrates the internal frequency signal S5 with a frequency from 30 MHz to 3 KHz. FIG. 8A illustrates the partly enlarged internal frequency signal S5 and the light receiving signal S4. FIG. 8D illustrates the intermittent difference frequency signal S7. FIG. 8E illustrates the partly enlarged intermittent difference frequency signal S7.

Figure 8:
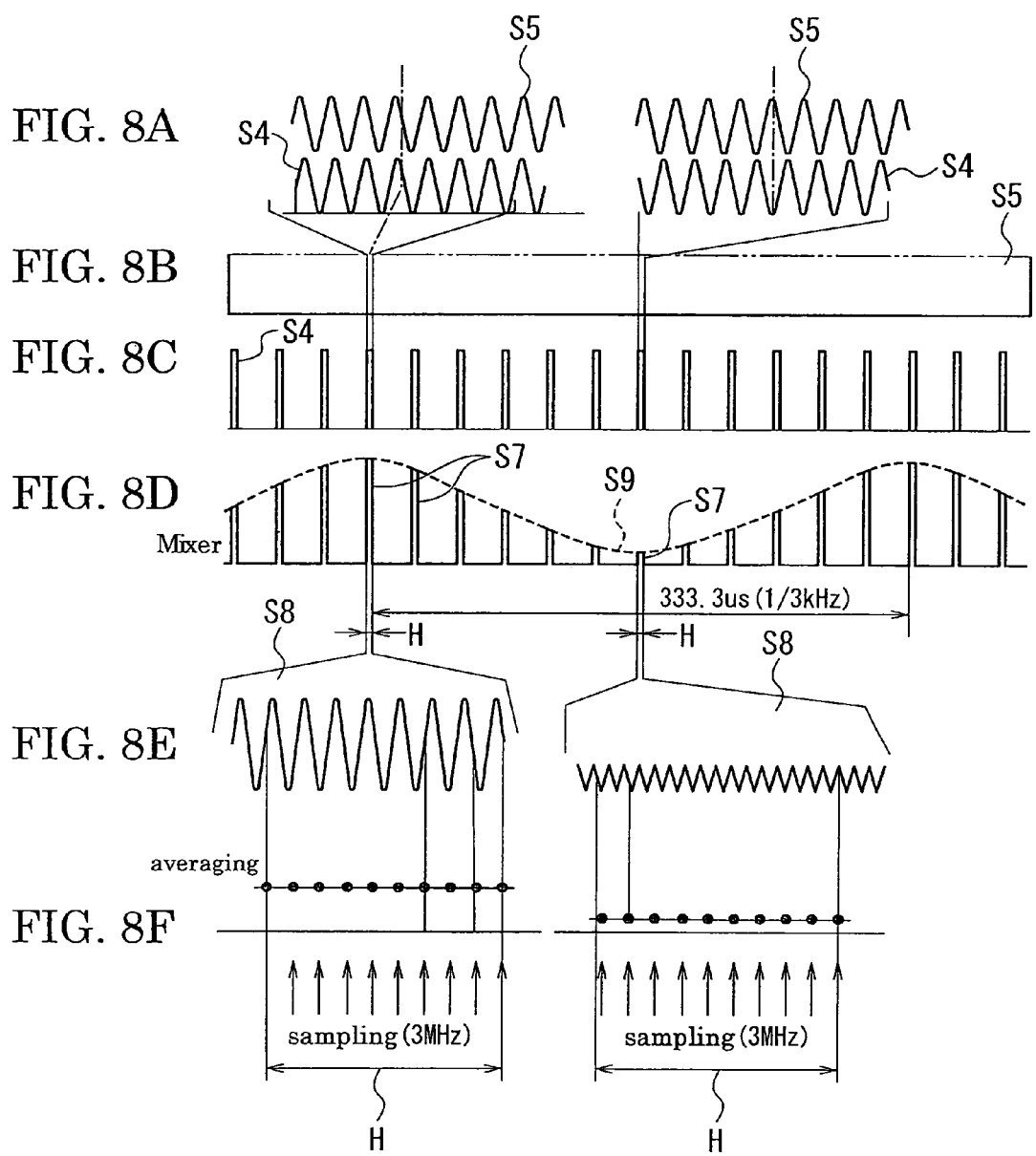
FIGS. 8A to 8F are explanation views illustrating an intermittent difference frequency signal obtained by receiving modulated light according to the present invention.
Figure 9:
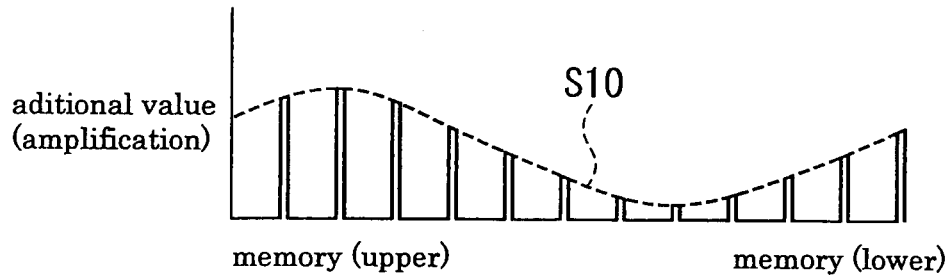
FIG. 9 is a view illustrating a frame format of integrated frequency signal data obtained by adding an intermittent difference frequency signal according to the present invention for a plurality of periods.

Since the difference between the light receiving signal S4 and the internal frequency signal S5 is 3 KHz, the intermittent difference frequency signal S7 becomes a beat signal with a frequency of 3 KHz, in other words, a beat signal S9 shown in FIG. 8D. The intermittent difference frequency signal S7 is amplified by an amplifier 30, and input to an averaging circuit 31. When the averaging circuit 31 is not existed, the amplified intermittent difference frequency signal S7 is directly input to an A/D converter 32. The averaging circuit 31 has a role for averaging a signal S8 contained in the intermittent difference frequency signal S7 by a timing pulse generator 33. For example, an averaging circuit includes a low pass filter. At this point, the time constant of low pass filter is shorter than an intermittent pulse width.

The timing pulse generator 33 outputs a timing pulse, which is synchronized to the 30 MHz or 300 KHz modulation signal, toward an A/D converter 32 and an arithmetic logical unit 36.

If the intermittent difference frequency signal S7 which is obtained by receiving the reflection modulated measuring light Q" modulated by the modulation signal S2 with a frequency of 30 MHz and the averaged output are sampled by a 3 MHz frequency, 10 sampling analog data are obtained during a period H, the signal generation period of intermittent pulse signal P1 as shown in FIG. 8F. The averaging circuit 31 outputs the averaged average analog data to the A/D converter 32.

The A/D converter 32 samples data which is synchronized to the timing pulse generator 33. Here, the 3 KHz intermittent difference frequency signal S7 is sampled by 3 MHz, so that the total number during one frequency of the intermittent difference frequency signal S7 becomes 1000.

This sampling data are stored in a memory 35 as a storing device through an adder 34. The sampling data stored in the memory 35 is input to the adder 34. The adder 34 has a role for adding the sampling data of intermittent difference frequency signal S7 for 10 periods (n period), for example, and outputs the integrated value of the intermittent difference frequency signal S7. After that integrated difference frequency signal data (integrated data) S10 are obtained. The data is the integrated value of 10 data, and if 1/10 of respective integrated value is obtained, the average of the ten data is obtained.

Information is sent and received between the arithmetic logical unit 36 and the memory 35, and the arithmetic logical unit 36 generates a sine wave curve based on the sampling data stored in the memory 35.

Figure 10:
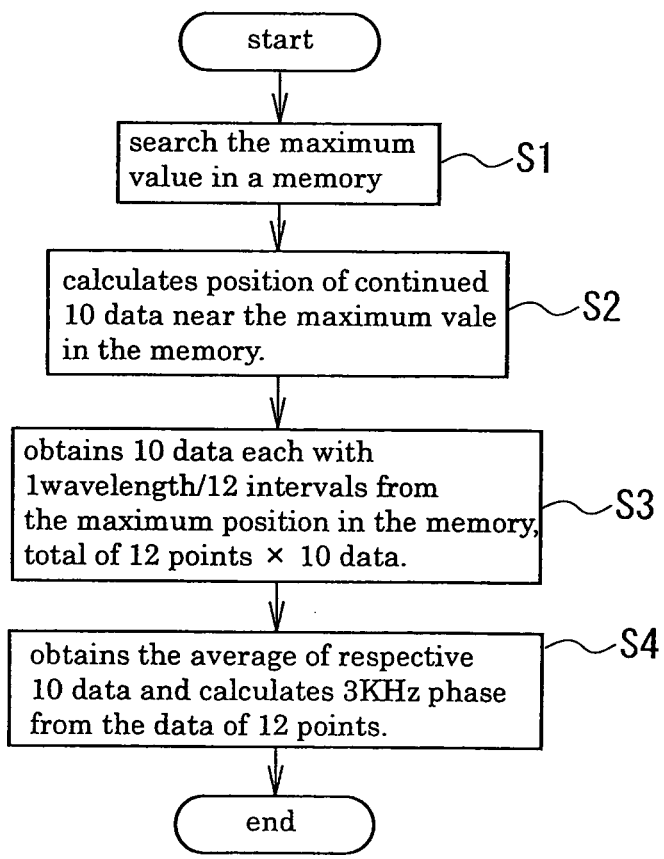
FIG. 10 is a flow chart for describing an example operation of electric distance meter according to the present invention.
Figure 11:
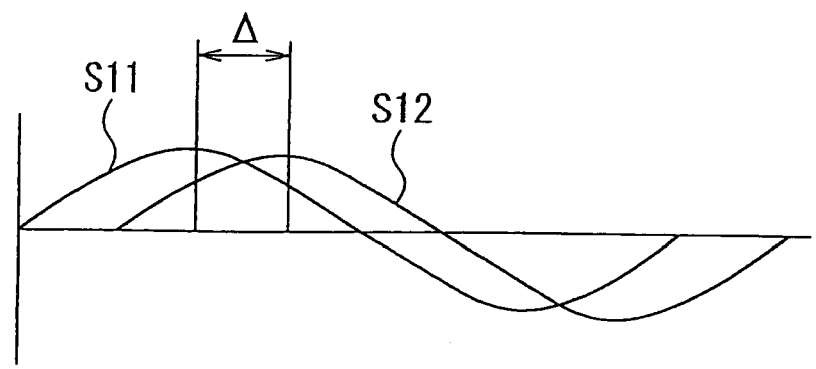
FIG. 11 is a view describing a frame format of the phase difference between the sine wave curve obtained through a reference optical path and the sine wave curve obtained by a measurement.

More specifically, as illustrated in FIG. 10, the arithmetic logical unit 36 searches the maximum value in the memory 35 (S1), calculates the position of continuous 10 data near the maximum value (S2), samples 12 points by 10 data each from the maximum value position in the memory with a wavelength of 1/12 second (S3), obtains the average of respective 10 data, and generates a sine wave curve S11 shown in FIG. 11 from the integrated frequency signal data of 12 points (added value data of 12 points) (S4). The arithmetic logical unit 36 also generates a sine wave curve S12 based on the modulation signal contained in the intermittent difference frequency signal obtained through the reference optical path. The arithmetic logical unit 36 calculates the phase difference of sine wave curve S11 with respect to the sine wave curve S12, and the distance to an object to be measured is thereby obtained.

Figure 12:
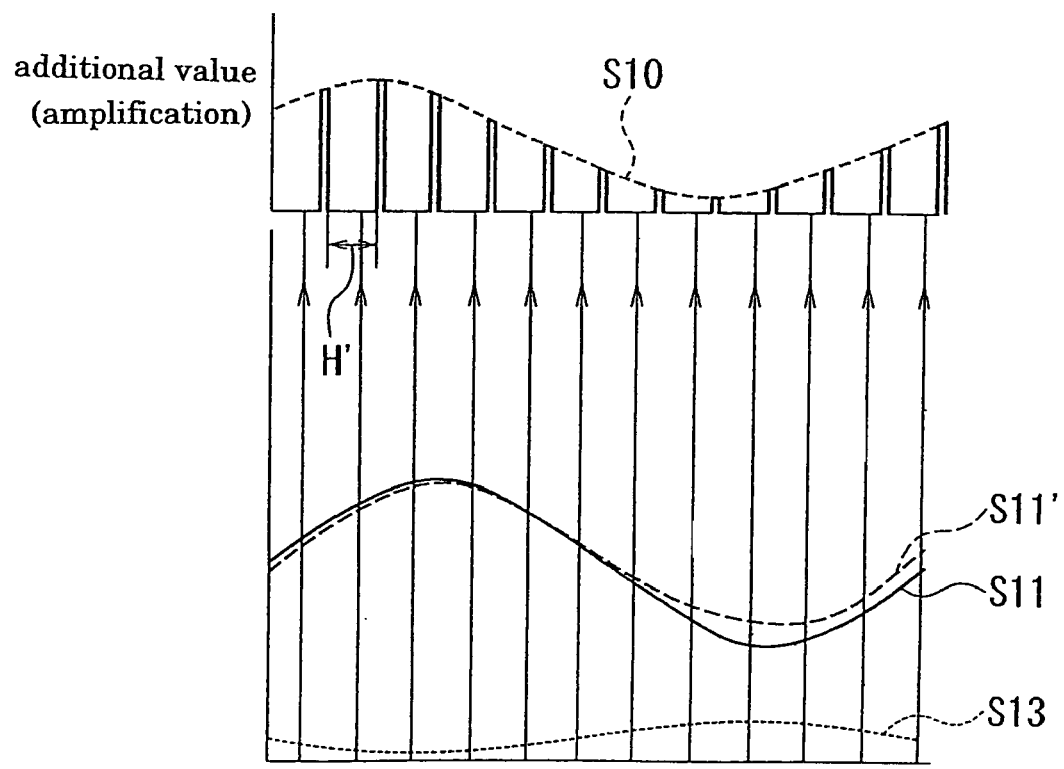
FIG. 12 is an explanation view for obtaining a corrected sine wave curve by correcting integrated frequency signal data with sampling noise data.

Here, the arithmetic logical unit 36 is adopted to calculate a distance based on the phase difference by obtaining the sine wave curve S11 based on the integrated frequency signal data S10. However, as illustrated in FIG. 12, it may be possible for the arithmetic logical unit 36 to sample the data in H', the non-generation period of intermittent pulse signal P1, generate a noise curve S13 based on the sampling noise data, obtain a corrected sine wave curve S11' by correcting the difference of the sine wave curve S11 based on the noise curve S13, and obtain the phase difference based on the difference between the corrected sine wave curve S11' and the sine wave curve S12.

If the corrected sine wave curve S11' is obtained, the noise contained in the reflection modulated measuring light Q" and the induced noise contained in the measuring circuit can be eliminated, so that a distance can be measured further precisely.

With the construction described above, the present invention can improve an extension of measurable distance range while maintaining safety to eyes.

What is claimed is:

1. An electric distance meter, which irradiates measuring light to an object to be measured and measures a distance from a phase difference between the measuring light reflected by the object and internal reference light, comprising:

a device configured to generate a modulation signal for measuring the distance;

a pulse signal generation device configured to generate a pulse signal, which emits the measuring light as pulsed light;

an AND circuit, which overlaps the modulation signal to only an interval of the pulse signal:

a driver circuit, which drives a light emitting element based on a signal from the AND circuit to emit the measuring light;

a frequency signal generation device configured to generate an internal frequency signal with a frequency different from said modulation signal;

a mixing circuit, which mixes the pulse signal of the measuring light and the internal frequency signal, and generates a beat signal comprising the pulse signal as an intermittent difference frequency signal;

a sampling circuit, which samples the interval of the pulse signal of the intermittent difference frequency signal at a predetermined interval;

a storing device configured to store sampling data; and an arithmetic logical unit, which calculates the distance from a phase difference between a sine wave curve based on the sampling data of the reflected measuring light stored in the storing device and a sine wave curve based on the sampling data obtained through a reference optical path.

2. The electric distance meter according to claim 1, further comprising a processing circuit which averages a signal generation period of said intermittent difference frequency signal, wherein the sampling circuit samples a signal averaged by the averaging processing circuit, and the storing device stores the sampling data, and said arithmetic logical unit calculates the phase difference based on the sampling data stored in the storing device.

3. The electric distance meter according to claim 1, wherein said sampling data is integrated for a plurality of periods of said intermittent difference frequency signal, and said arithmetic logical unit generates said sine wave curve based on the data integrated for the plurality of periods.

4. The electric distance meter according to claim 1, wherein said arithmetic logical unit collects noise in a non-generation period of the intermittent pulse signal by said intermittent pulse signal generation device as sampling noise data, generates a noise curve based on the sampling noise data, and corrects the sine wave curve by obtaining a difference of said noise curve from the sine wave curve obtained by sampling said signal generation period.

5. The electric distance meter according to claim 1, wherein said intermittent difference frequency signal is generated by inputting said internal frequency signal directly to a light receiving element.

* * * * *